United States Patent
Lee et al.

(10) Patent No.: US 10,430,459 B2
(45) Date of Patent: Oct. 1, 2019

(54) SERVER AND METHOD FOR PROVIDING CITY STREET SEARCH SERVICE

(71) Applicant: ELECTRONICS AND TELECOMMUNICATIONS RESEARCH INSTITUTE, Daejeon-si (KR)

(72) Inventors: Seung Jae Lee, Daejeon-si (KR); Keun Dong Lee, Daejeon-si (KR); Hyung Kwan Son, Daejeon-si (KR); Weon Geun Oh, Daejeon-si (KR); Da Un Jung, Goyang-si (KR); Young Ho Suh, Daejeon-si (KR); Wook Ho Son, Daejeon-si (KR); Won Young Yoo, Daejeon-si (KR); Gil Haeng Lee, Seoul (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 201 days.

(21) Appl. No.: 15/332,136

(22) Filed: Oct. 24, 2016

(65) Prior Publication Data
US 2017/0199900 A1    Jul. 13, 2017

(30) Foreign Application Priority Data

Jan. 11, 2016  (KR) .................. 10-2016-0003357

(51) Int. Cl.
*G06F 17/30*   (2006.01)
*G06F 16/58*   (2019.01)
(Continued)

(52) U.S. Cl.
CPC ........ *G06F 16/5866* (2019.01); *G06F 16/248* (2019.01); *G06F 16/29* (2019.01);
(Continued)

(58) Field of Classification Search
CPC ......... G06F 17/30268; G06F 17/30241; G06F 17/3028; G06F 16/29; G06F 16/5866; G06F 16/587; G06F 16/51
(Continued)

(56) References Cited

U.S. PATENT DOCUMENTS 6,363,161 B2 * 3/2002 Laumeyer .......... G06K 9/00818
                                                    382/104
6,963,657 B1 * 11/2005 Nishigaki ............... G01S 11/12
                                                    340/901

(Continued)

FOREIGN PATENT DOCUMENTS

KR   10-2009-0064967 A   6/2009
KR   10-2015-0049529 A   5/2015

OTHER PUBLICATIONS

Jan Knopp et al., "Avoiding confusing features in place recognition", In ECCV, Chersonissos, 2010.
(Continued)

*Primary Examiner* — Mark E Hershley
(74) *Attorney, Agent, or Firm* — LRK Patent Law Firm

(57) ABSTRACT

A server for providing a city street search service includes a street information database configured to store city street images, a feature selection unit configured to select at least one feature according to a predetermined criterion when a city street image for searching and two or more features for the image are received from a user terminal, a candidate extraction unit configured to extract a candidate list of a city street image, a feature matching unit configured to match the city street image for registration included in the extracted candidate list and the at least one selected feature, and a search result provision unit configured to provide the user terminal with a result of the matching as result information regarding the city street image for searching.

12 Claims, 21 Drawing Sheets

(51) Int. Cl.
| | |
|---|---|
| *G06N 20/00* | (2019.01) |
| *G06F 16/29* | (2019.01) |
| *G06F 16/51* | (2019.01) |
| *G06F 16/248* | (2019.01) |
| *G06K 9/52* | (2006.01) |
| *G06K 9/62* | (2006.01) |
| *G06K 9/00* | (2006.01) |
| *G06K 9/46* | (2006.01) |

(52) U.S. Cl.
CPC ......... *G06F 16/51* (2019.01); *G06K 9/00704* (2013.01); *G06K 9/4671* (2013.01); *G06K 9/52* (2013.01); *G06K 9/6201* (2013.01); *G06K 9/6211* (2013.01); *G06K 9/6267* (2013.01); *G06N 20/00* (2019.01); *G06K 2009/4666* (2013.01); *G06T 2207/20021* (2013.01); *G06T 2207/20076* (2013.01); *G06T 2215/16* (2013.01)

(58) Field of Classification Search
USPC ........................................................ 707/722
See application file for complete search history.

(56) References Cited

U.S. PATENT DOCUMENTS

| | | | | |
|---|---|---|---|---|
| 6,993,159 | B1* | 1/2006 | Ishii | B60R 1/00 382/104 |
| 7,340,089 | B2* | 3/2008 | Nair | G06K 9/6282 382/159 |
| 8,532,400 | B1* | 9/2013 | Babenko | G06K 9/00671 382/224 |
| 9,305,223 | B1* | 4/2016 | Ogale | G06K 9/00825 |
| 9,418,482 | B1* | 8/2016 | Yang | G06F 17/30265 |
| 9,508,263 | B1* | 11/2016 | Teng | B64C 39/024 |
| 2003/0016869 | A1* | 1/2003 | Laumeyer | G06K 9/00818 382/190 |
| 2005/0288859 | A1* | 12/2005 | Golding | G01C 21/3602 701/438 |
| 2006/0041375 | A1* | 2/2006 | Witmer | G01C 15/00 701/532 |
| 2007/0104368 | A1* | 5/2007 | Miyamori | G06T 7/20 382/181 |
| 2007/0206833 | A1* | 9/2007 | Otsuka | B60R 21/0134 382/103 |
| 2010/0253496 | A1* | 10/2010 | Nishikawa | G01D 7/00 340/441 |
| 2011/0191379 | A1* | 8/2011 | Watanabe | G01C 21/32 707/792 |
| 2011/0191387 | A1* | 8/2011 | Kutomi | G01C 21/32 707/803 |
| 2011/0311130 | A1* | 12/2011 | Ichimori | G01C 11/06 382/154 |
| 2013/0028517 | A1* | 1/2013 | Yoo | G06K 9/00375 382/173 |
| 2013/0050492 | A1* | 2/2013 | Lehning | G06K 9/00785 348/148 |
| 2014/0133741 | A1* | 5/2014 | Wang | G06T 17/05 382/154 |
| 2014/0201126 | A1* | 7/2014 | Zadeh | G06K 9/627 706/52 |
| 2014/0328141 | A1* | 11/2014 | Rikoski | B22D 31/00 367/91 |
| 2015/0172633 | A1* | 6/2015 | Nobori | H04N 5/23238 348/36 |
| 2015/0175071 | A1* | 6/2015 | Ishimoto | E02F 9/262 348/148 |
| 2015/0222859 | A1* | 8/2015 | Schweid | G06K 9/00624 348/148 |
| 2015/0310012 | A1* | 10/2015 | Kim | G06F 17/30047 707/722 |
| 2016/0027325 | A1* | 1/2016 | Malhotra | G06F 19/3481 434/252 |
| 2016/0093214 | A1* | 3/2016 | Wu | G06K 9/00812 348/148 |
| 2017/0308092 | A1* | 10/2017 | Altinger | B62D 15/0285 |

OTHER PUBLICATIONS

David M. Chen et al., "City-scale landmark identification on mobile devices", IEEE International Conference on Computer Vision and Pattern Recognition (CVPR), Jun. 2011.

* cited by examiner

SERVER AND METHOD FOR PROVIDING CITY STREET SEARCH SERVICE

CROSS-REFERENCE TO RELATED APPLICATION(S)

This application claims priority from Korean Patent Application No. 10-2016-0003357, filed on Jan. 11, 2016, in the Korean Intellectual Property Office, the disclosure of which is incorporated herein by reference in its entirety.

BACKGROUND

1. Field

The following description relates to a city street search service, and more particularly, to a server and method for providing a search service using a feature extracted from a city street image.

2. Description of Related Art

Generally, a city street search service, which provides information regarding a region or a building about which a user has questions, utilizes wireless positioning technology using Global Positioning System (GPS) and WiFi. In another way, a search can be performed using an image feature. For a city street search using an image, advantageously, a target of which information is desired by a user can be directly photographed and found.

For an image-based search service, a city-scale, massive image database (DB) needs to be built, and a search technology dealing with obstacles such as trees, roads, or vehicles in an urban environment is needed.

In the paper "City-scale landmark identification on mobile devices," IEEE International Conference on Computer Vision and Pattern Recognition (CVPR), June 2011, presented by D. Chen, G. Baatz, K. Koeser, S. Tsai, R. Vedantham, T. Pylvanainen, K. Roimela, X. Chen, J. Bach, M. Pollefeys, B. Girod, and R. Grzeszczuk, a service DB for street search has been built by correcting image distortion on the basis of a captured panorama image in addition to three-dimensional (3D) information. In this process, a 3D model is essential, and expensive equipment for obtaining depth information, such as Light Detection and Ranging (LIDAR), is needed. One drawback of such an approach is that it cannot be applied to a search image of a user who utilizes a camera of a terminal. In addition, the approach does not consider obstacles such as trees, roads, vehicles, etc.

In order to solve such a problem of the obstacles, the paper "Avoiding confusing features in place recognition", In ECCV, Chersonissos, 2010, presented by J. Knopp, J. Sivic and T. Pajdla has proposed a method of selecting an area such as a tree from an image by utilizing a matching relation between features of a search image and a distant image on the basis that a peripheral image is visually different from a distant image. However, this method has limitations in that it takes too much calculation time to perform comparisons with average M distant images when total N pieces of data for building a DB have been obtained. In addition, when there is no location information of the search image, it is difficult to obtain distant images.

U.S. Pat. No. 8,532,400 B1, entitled "Scene Classification For Place Recognition," discloses a process of utilizing camera sensor information primarily in order to search for a place and then determining whether a captured image is an image of a place or not by utilizing image processing and meta information. This process includes searching for an image determined as being an image of a place. However, the solution of building a large-scale DB and the method of extracting and matching features while considering aforementioned obstacle areas are not disclosed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a server and method for providing a city street search service that may reduce database capacity necessary for a city street search.

The following description also relates to a server and method for providing a city street search service that may reduce calculation time for a city street search.

The following description also relates a server and method for providing a city street search service that may distinguish a building on a city street, using an image.

The following description also relates a server and method for providing a city street search service in order to solve a problem of selecting only a feature from the image without dealing with a covered region.

In one general aspect, a server for providing a city street search service includes a street information database configured to store city street images for registration and feature and mete information mapped to the images, a feature selection unit configured to select at least one feature according to a predetermined criterion when a city street image for searching and two or more features for the image are received from a user terminal, a candidate extraction unit configured to extract a candidate list of a city street image for registration corresponding to the at least one selected feature from the street information database, a feature matching unit configured to match the city street image for registration included in the extracted candidate list and the at least one selected feature, and a search result provision unit configured to provide the user terminal with result of the matching a result information regarding the city street image for searching.

In another general aspect, a method of providing a city street search service includes selecting at least one feature according to a predetermined criterion when a city street image for searching and two or more features for the image from a user terminal, extracting a candidate list of a city street image for registration corresponding to the at least one selected feature from a street information database that is previously bulk, matching the city street image for registration included in the extracted candidate list and the at least one selected feature, and providing the user terminal with the matching result as result information regarding the city street image for searching.

Other features and aspects will be apparent from the following detailed description, the drawings, and the claims.

Figure 1:
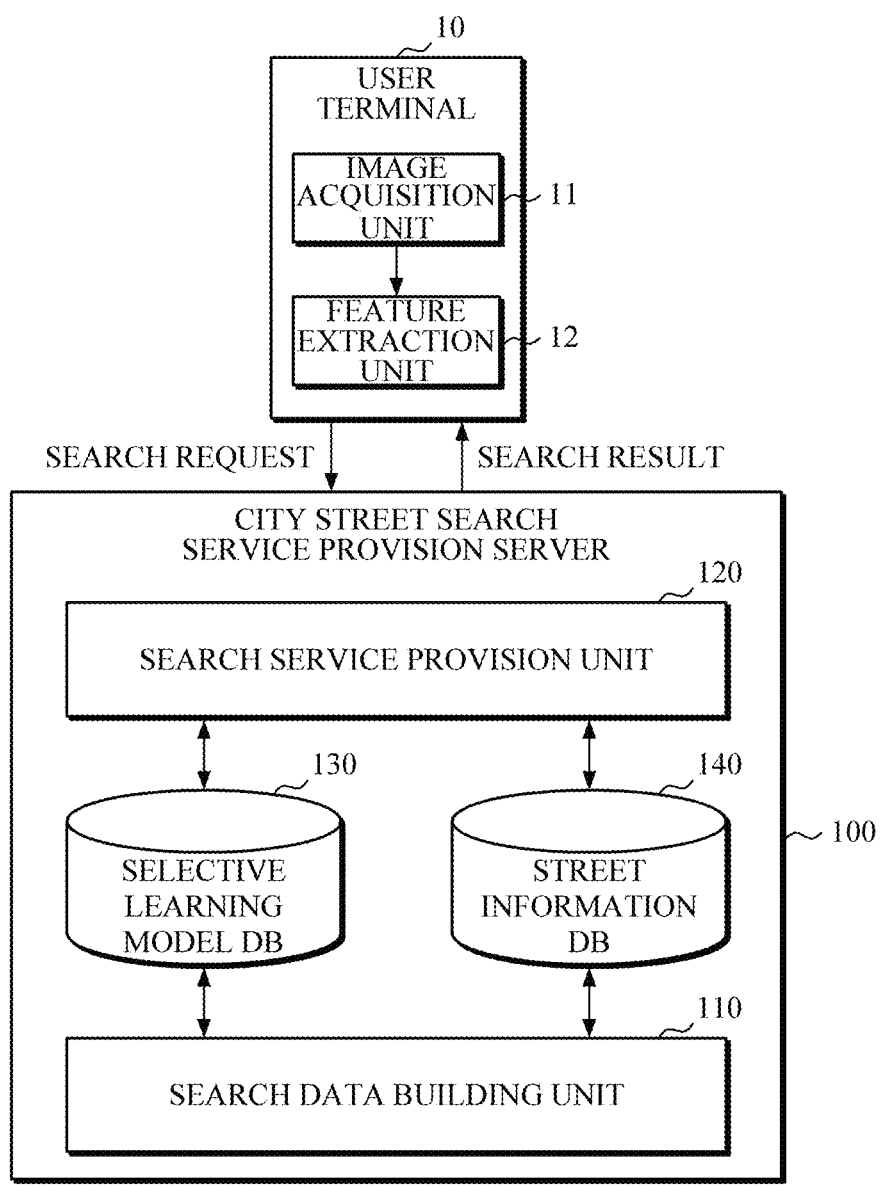
FIG. 1 is a block diagram showing a system for providing a city street search system according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, the present invention will be described in detail such that those of ordinary skill in the art can easily understand and reproduce the present invention through embodiments which will be described below with reference to the accompanying drawings.

In the following description, when the detailed description of the relevant known function or configuration is determined to unnecessarily obscure the important point of the present invention, the detailed description will be omitted.

Moreover, the terms used herein are defined in consideration of their functions in exemplary embodiments of the present invention and thus may be changed depending on a user, the intent of an operator, or custom. Accordingly, the terms should be defined based on the following overall description of this specification.

FIG. 1 is a block diagram showing a system for providing a city street search system according to an embodiment of the present invention.

Referring to FIG. 1, for a city street search service, when a search is attempted with a city street image for searching that is captured through a user terminal 10, a server for providing a city street search service (hereinafter referred to as a "server") 100 provides the user terminal 10 with the result information on a city street search corresponding to the attempt.

The present invention is intended to identify a building in a city street using an image and includes extracting features from the image, selecting features advantageous to matching, and selecting a building region from the image. That is, the building region in the image is determined by making a selection of a region through CNN learning, selecting a region from candidates determined on the basis of road view image data (a panorama image, etc.) and building data that are utilized at the time of building a database (DB) for city street search photographs, and selecting a feature according to a feature importance learned through a matching-pair and non-matching-pair model for a building matching, thus effectively enhancing a feature size and matching performance.

Here, the user terminal 10 may be a mobile communication terminal such as a personal digital assistant, a smartphone, and a navigation terminal. Also, the user terminal 10 may be applied to any device capable of delivering a city street image for searching to the server 100 to make a search request, for example, a personal computer such as a desktop computer, a notebook, etc.

According to an embodiment, the user terminal 10 may include an image acquisition unit 11 configured to acquire a city street image for searching and a feature extraction unit 12 configured to extract a feature from the acquired city street image for searching. Here, the image acquisition unit 11 may detect a pre-captured city street image from a memory (not shown), receive a city street image through a communication unit (not shown), or capture and acquire a city street image in real time. The feature extraction unit 12 extracts two or more features from the acquired city street image for searching according to a predetermined algorithm. The user terminal 10 may deliver the city street image for searching, the extracted two or more features, and meta information including GPS information to the server 100 through a communication unit (not shown) and receive a search result from the server 100. According to another embodiment, when the feature extraction unit 12 is not provided, the user terminal 10 may transmit only the city street image for searching and the met information including the GPS information to the server 100.

The server 100 includes a search data building unit 110, a march service provision unit 120, a selective learning model DB 130, and a street information DB 140.

The search data building unit 110 builds the street information DB 130 for city street search. Here, the capacity and quality of the street information DB 140 are very important. Accordingly, even though there are the same number of images, the capacity may be reduced by obtaining an image including only a small number of obstacle elements such as trees, roads, etc., and the quality may be enhanced by including only important information. Accordingly, the search data building unit 110 is configured to remove features corresponding to obstacle elements such as a tree, a road, etc. from the features extracted from the city street image, select the remaining features, and stores the selected features in the street information DB 140. A detailed description thereof will be provided with reference to FIG. 2.

Also, the search service provision unit 120 may reduce extraction of features from an unnecessary part, such as an obstacle element, of the city street image for marching received from the user terminal 10, thus reducing search time and performance. A detailed description thereof will be provided with reference to FIG. 3.

The selective learning model DB 130 stores learning models used by the search data building unit 110 and the search service provision unit 120 to select features. According to an embodiment of the present invention, the selective learning model DB 130 may include a learning model for region classification and a matching model composed of a matching pair, which is a pair of photographs that includes the a building, that is the same therein and a non-matching pair, which is a pair of photographs that does not include a building that is the same therein.

The street information DB 140 stores city street images for registration and feature and meta information mapped to the images.

Figure 2:
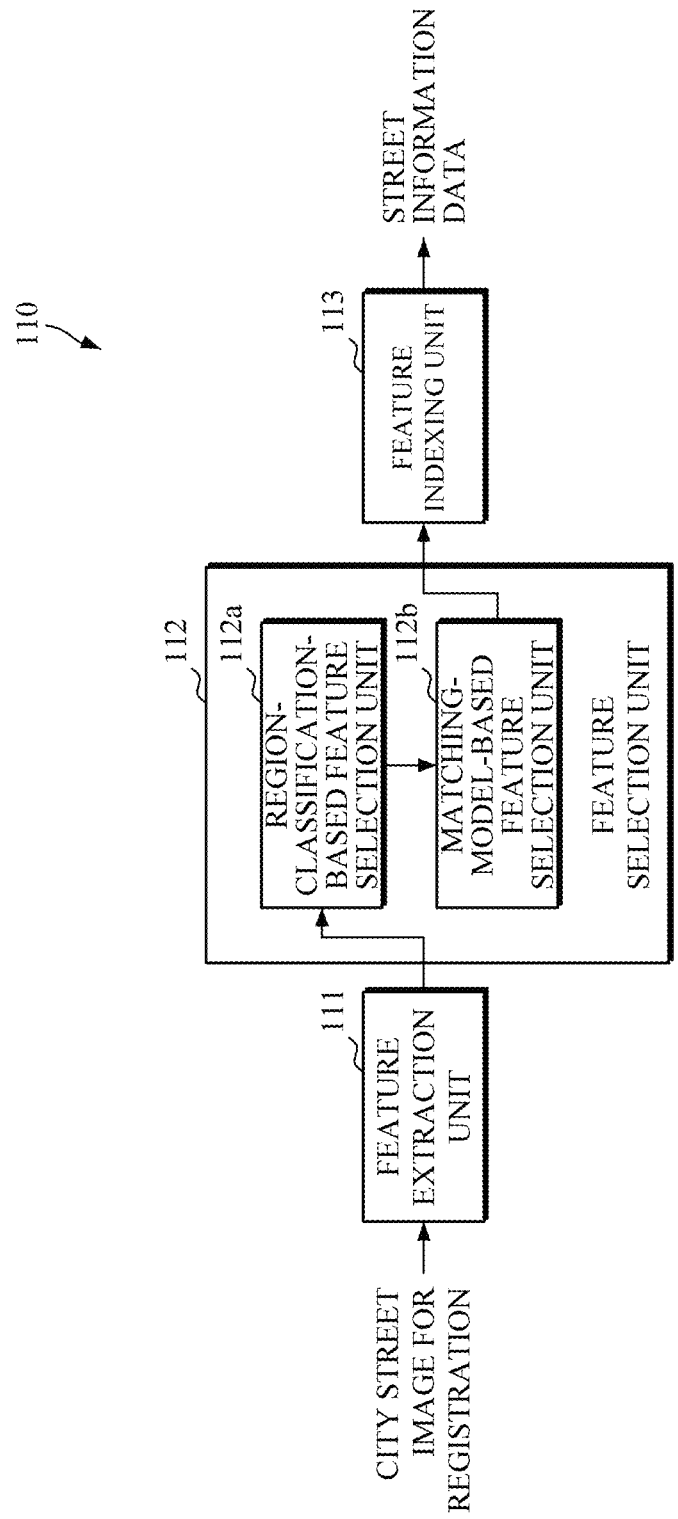
FIG. 2 is a detailed block diagram showing a search data building unit according to an embodiment of the present invention.

FIG. 2 is a detailed block diagram showing a march data building unit according to an embodiment of the present invention.

Referring to FIG. 2, the search data building unit 110 may include a feature extraction unit 111, a feature selection unit 112, and a feature indexing unit 113.

The feature extraction unit 111 extracts two or more features for each of a plurality of city street images that are collected.

The feature selection unit 112 selects at least one feature from among the extracted two or more features according to a predetermined criterion. According to an embodiment, the feature selection unit 112 includes a region-classification-based feature selection unit 112*a* and a matching-model-based feature selection unit 112*b* and may perform two selection processes. The region-classification-based feature selection unit 112*a* excludes a region corresponding to an obstacle element from the two or more features. That is, the region-classification-based feature selection unit 112*a* determines regions corresponding to obstacle elements such as roads, sky, vehicles, etc. and limits extraction of features from the regions. A detailed description thereof will be provided with reference to FIGS. 4 to 8.

The matching-model-based selection unit 112*b* performs reselection from the features selected by the region-classification-based feature selection unit 112*a* using a matching model. A detailed description thereof will be provided with reference to FIGS. 9A and 9B.

The feature indexing unit 113 indexes and stores the reselected features in the street information DB 140. A feature indexing method uses an index training DB, extracts features on a large scale, obtains K representative values, and uses a relation with the values. For example, when K-means clustering, which is a representative clustering method, is used, 128 core representative values may be obtained, and a feature index may be formed by utilizing a distribution (an average and a variance) of the representative values and the feature values.

Figure 3:
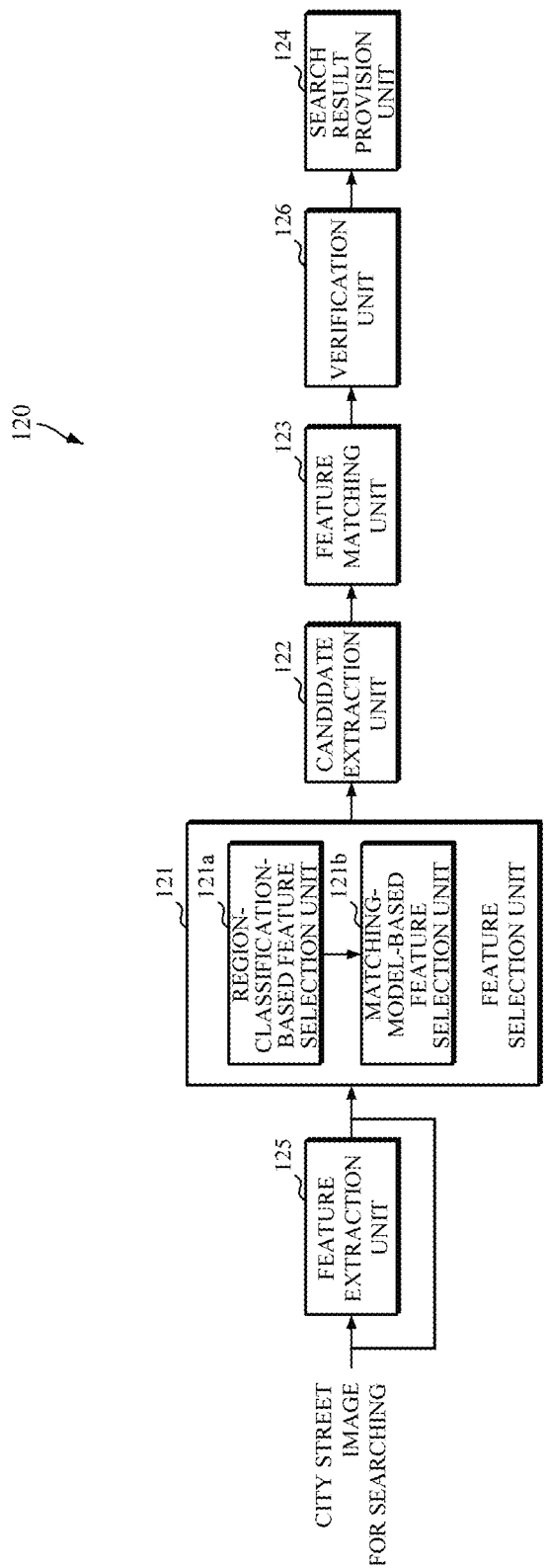
FIG. 3 is a detailed block diagram showing a search service provision unit according to an embodiment of the present invention.

FIG. 3 is a detailed block diagram showing a search service provision unit according to an embodiment of the present invention.

Referring to FIG. 3, the search service provision unit 120 may include a feature selection unit 121, a candidate extraction unit 122, a feature matching unit 123, and a search result provision unit 124. Additionally, the search service provision unit 120 may further include a feature extraction unit 125 and a verification unit 126.

When only the city street image for searching is received from the user terminal 10, the feature extraction unit 125 extracts two or more features from the received city street image for searching.

When the city street image for searching and the two or more features of the city street image for searching are received from the user terminal 10, the feature selection unit 121 selects at least one feature according to a predetermined criterion. Here, the feature selection unit 121 may select features two times.

First, the region-classification-based feature selection unit 121*a* excludes a region corresponding to an obstacle element from the two or more features. A detailed description thereof will be provided with reference to FIGS. 4 to 8.

Next, the matching-model-based selection unit 121*b* forms a matching probability distribution of each of the features selected using a matching model by the region-classification-based feature selection unit 121*a* and selects a predetermined number of features in descending order of matching probability. A detailed description thereof will be provided with reference to FIGS. 9A and 9B.

The candidate extraction unit 122 extracts a candidate list for a city street image for registration corresponding to at least one feature selected from the street information DB 140. In this case, a list of similar image candidates may be created using a feature index used by the feature indexing unit 113 that has been described above. For the candidate list, a list of images that have a threshold value or less is formed by comparing distances from the features. In addition, in consideration of a relation between the features in this list, geometric verification is performed by utilizing a method such as random sample consensus (RANSAC).

The feature matching unit 123 matches at least one selected feature to the city street image for registration included in the extracted candidate list. The verification unit 126 performs verification of the matched feature. The search result provision unit 124 provides the user terminal 10 with a matching result as result information regarding the city street image for searching. That is, finely, the search result provision unit 124 combines the image list with additionally obtainable metadata (e.g., GPS) to provide the result and the information.

Figure 4:
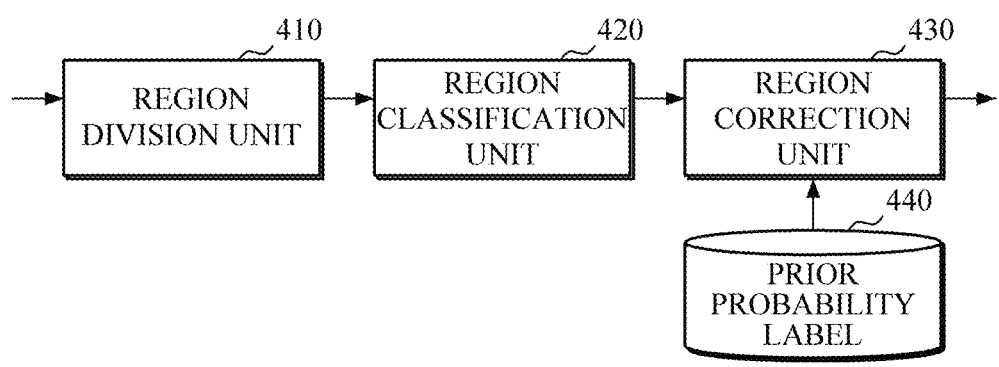
FIG. 4 is a detailed block diagram showing a region-classification-based feature selection unit according to an embodiment of the present invention.

FIG. 4 is a detailed block diagram showing a region-classification-based feature selection unit according to an embodiment of the present invention.

Referring to FIG. 4, each of the region-classification-based feature selection units 112*a* and 121*a* includes a region division unit 410 and a region classification unit 420. Additionally, each of the region-classification-based feature selection units 112*a* and 121*a* further includes a region correction unit 430.

The region division unit 410 divides the city street image for searching into a predetermined number of regions. A learned model performs region classification according to N*N divided regions as shown in FIG. 5. On the basis of the classification, the learned model outputs the classification result for 32*32 regions of an input image.

The region classification unit 420 classifies the divided regions according to a learning model for the region classification and excludes features included in regions classified as obstacle elements. For this, as shown in FIG. 6, the region classification unit 420 should complete learning in advance with training images as shown in FIG. 5.

Figure 5A:
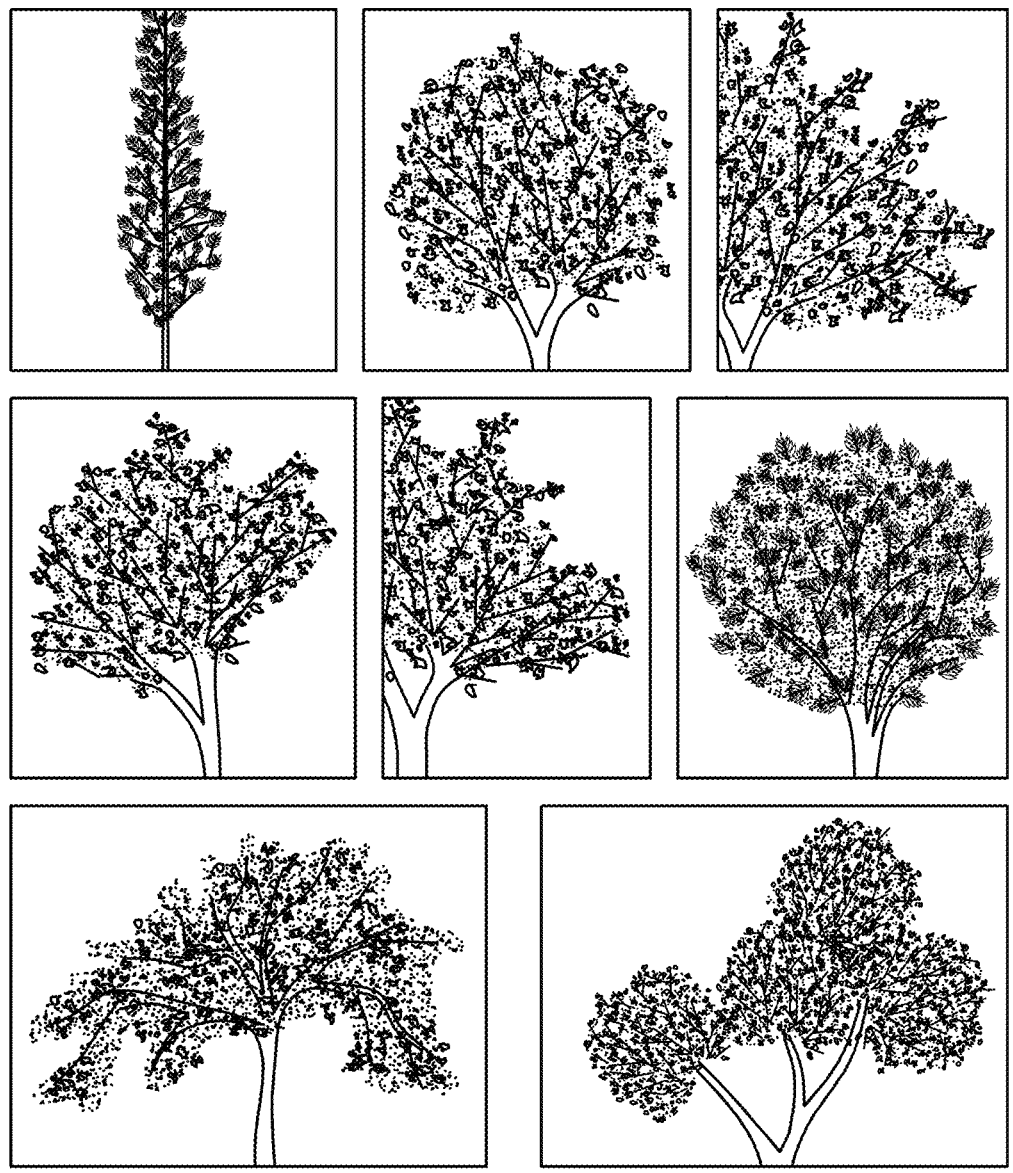
FIGS. 5A and 5B are exemplary views showing divided images for region classification according to the present invention.
Figure 5B:
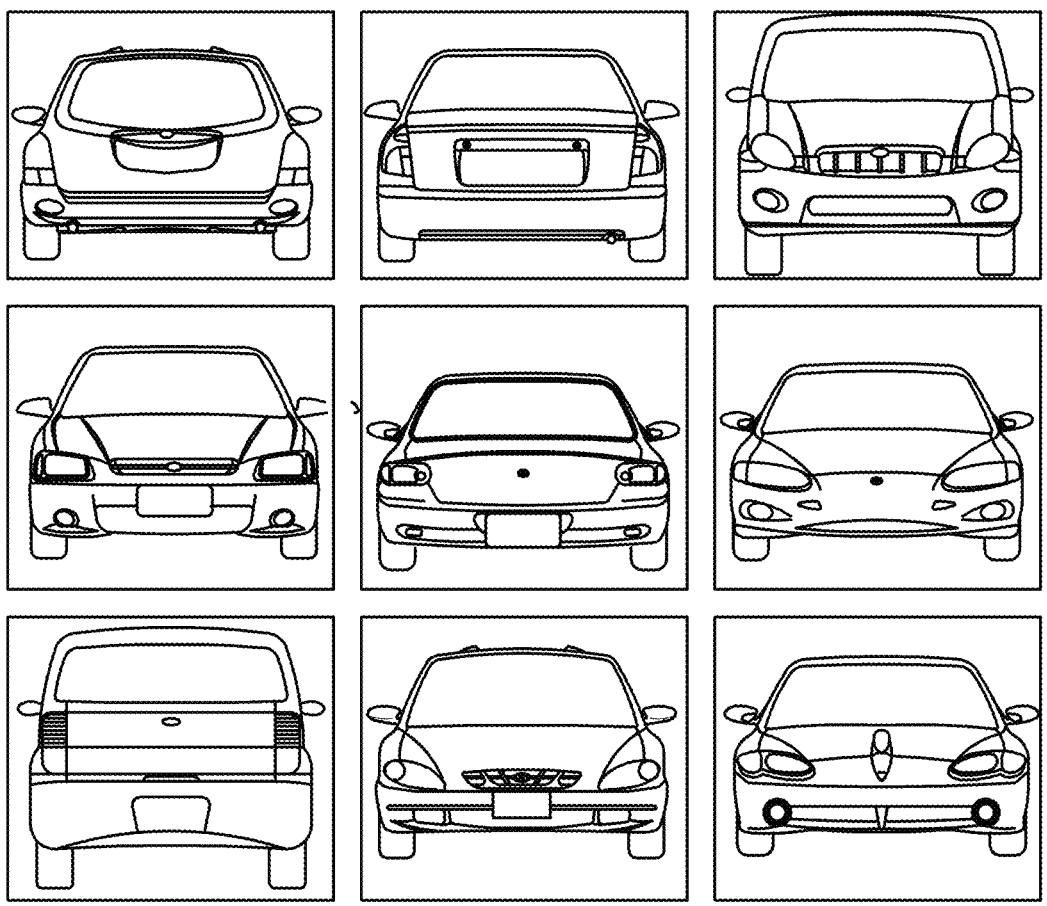

FIGS. 5A and 5B are exemplary views showing divided images for region classification according to the present invention.

FIG. 5A shows images of regions corresponding to trees. FIG. 5B shows images of regions corresponding to vehicles.

Figure 6:
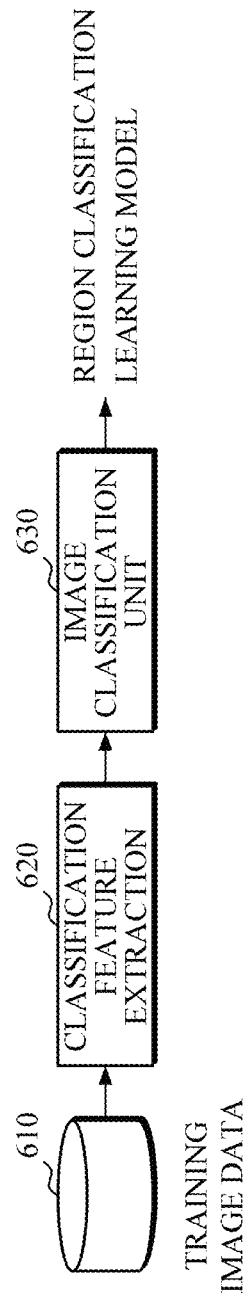
FIG. 6 is a view for describing a process of learning a region classification unit according to the present invention.

FIG. 6 is a view for describing a process of learning a region classification unit according to the present invention.

Referring to FIG. 6, the region classification unit 420 learns, in advance, classification features extracted from training image data 610 as shown in FIGS. 5A to 5E to create a region classification learning model. That is, after a collected image is normalized to 32*32 regions, the learning is performed using a convolution neural network to create the model. For this, an existing learning method such as support vector machines (SVMs) may be utilized. For the present invention, 3-step convolution layer and 2-step fully connected layer were utilized. Such a configuration can be variously modified, and the size of the classification region can be modified according to application.

Referring to FIG. 4 again, additionally, the region correction unit 430 corrects a result for the region classification according to prior region information or a peripheral classification result. In this case, the region correction unit 430 may perform the correction using a prior probability table, and the prior probability table is formed by forming an overlapped image on the basis of learning data that indicates, in advance, a road region and a sky region and normalizing the overlapped image to probability values.

Figure 7:
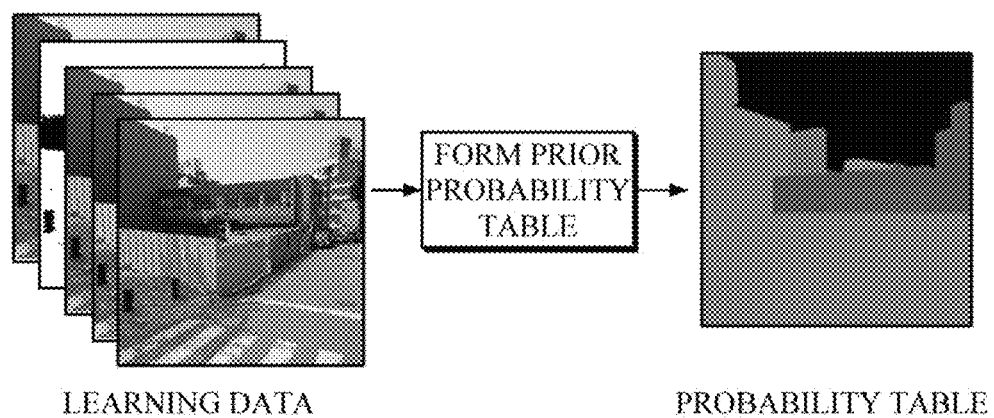
FIG. 7 is a view for describing a process of forming a prior probability table according to the present invention.

FIG. 7 is a view for describing a process of forming a prior probability table according to the present invention.

Referring to FIG. 7, a prior probability table on the right side may be found by setting a black region of an image for learning a road region on the left side as 1, setting the remaining region as 0, doing the sum for the learning data, and performing normalization to the total sum. Likewise, the prior probability table is found with respect to the road region, etc. The prior probability table may vary depending on an object to be classified and also depending on scope of an application service. For example, a tree, a building, and a vehicle are first corrected by averaging peripheral classification results, and then a road and sky are corrected with a peripheral average value, when values thereof are different based on prior probabilities.

Figure 8A:
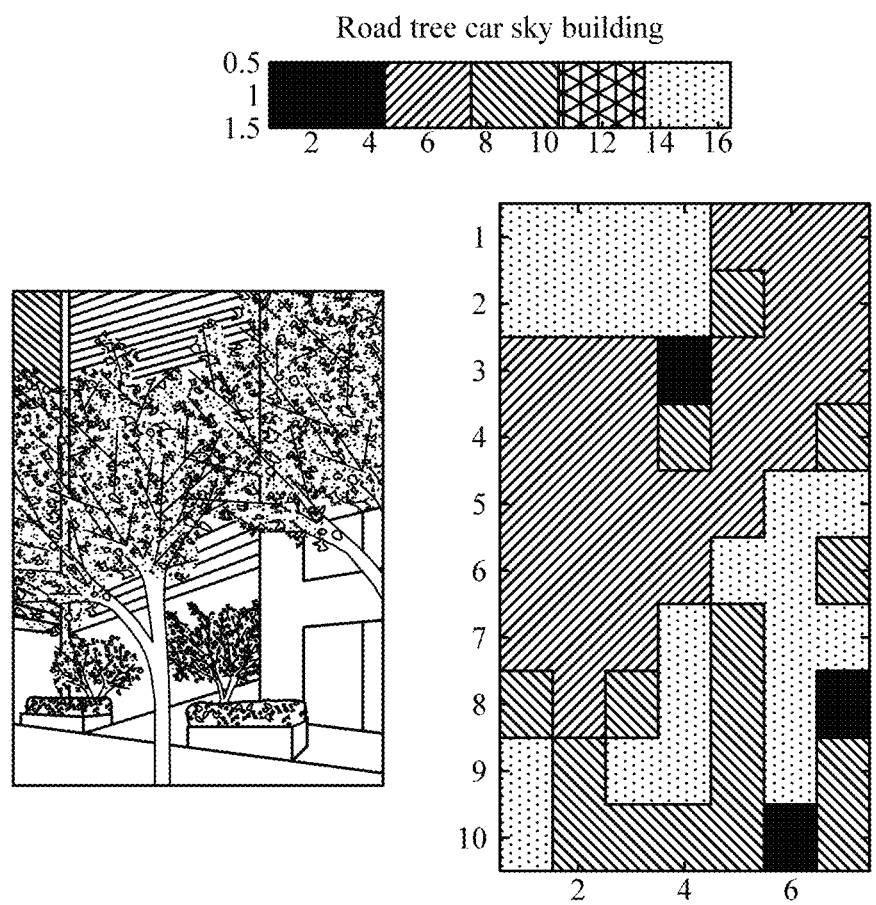
FIG. 8A is a view showing an example of a region classification result.
Figure 8B:
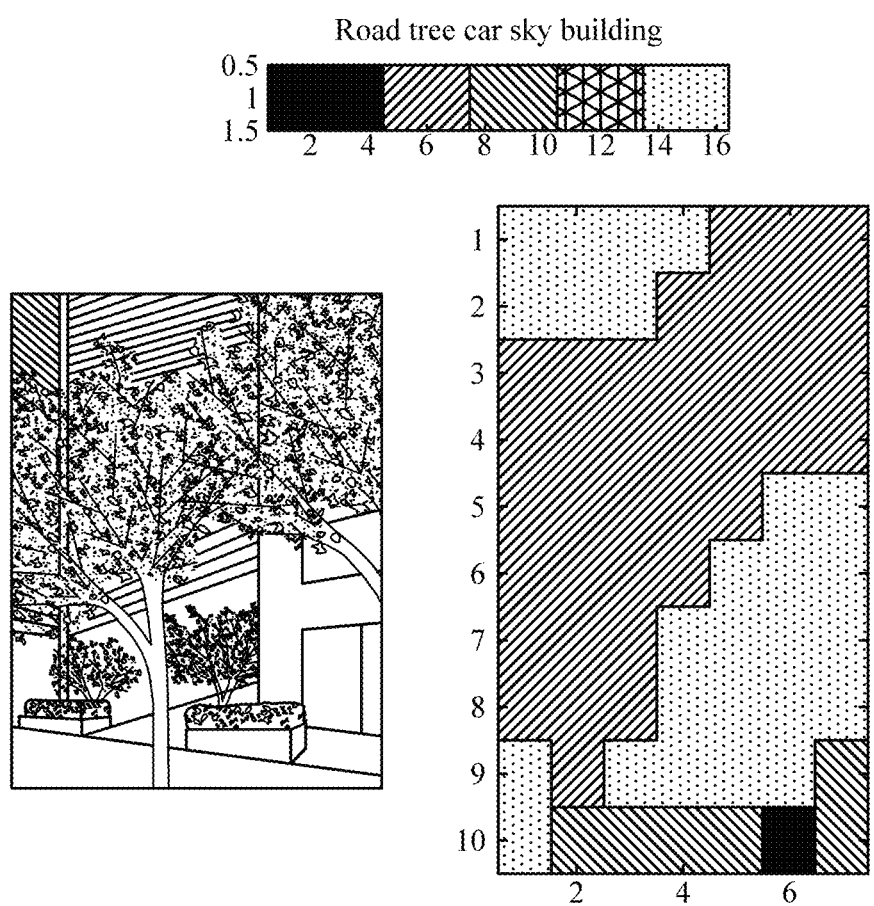
FIG. 8B is a view showing an example of a result corrected after region classification.

FIGS. 8A and 8B are views showing an example of a region classification result.

FIG. 8A shows an image obtained by first performing region classification in which there exists a mix of some trees and some buildings. FIG. 8B is a result of the region correction for the classified region of FIG. 8A. That is, it can be seen that a road depicted at upper center of FIG. 8A is inconsistent with a prior road probability and thus is corrected with a peripheral value as shown in FIG. 8B, and a result for a tree and a building in FIG. 8A are corrected by a peripheral value as shown in FIG. 8B.

Next, selection of a feature based on a matching model includes a process of forming matching pairs and non-matching pairs, forming matching probability distribution according to a feature extraction result parameter, and recommending a feature having a high matching probability.

Figure 9A:
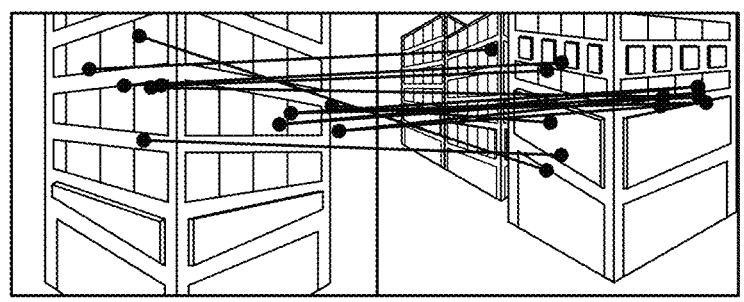
FIG. 9A is a view showing an example of a matching pair.
Figure 9B:
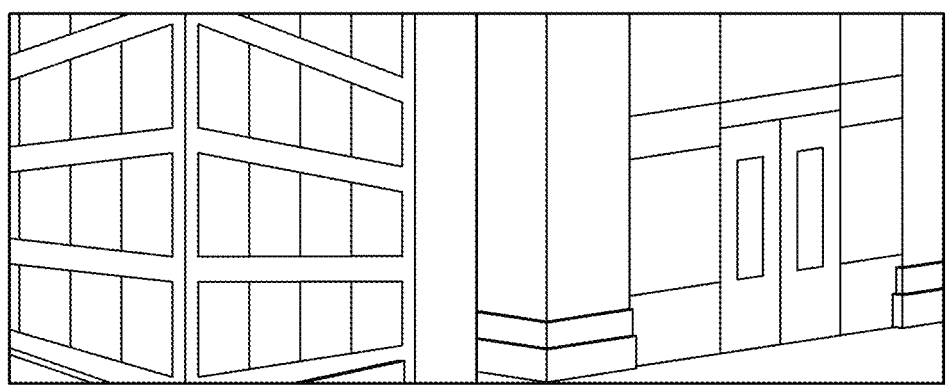
FIG. 9B is a view showing an example of a non-matching pair.

FIG. 9A is a view showing an example of a matching pair, and FIG. 9B is a view showing an example of a non-matching pair.

Referring to FIG. 9A, the matching pair refers to a pair of photographs including a building that is the same therein. Referring to FIG. 9B, the non-matching pair refers to a pair of different photographs. A probability density function (Pdf) is formed by finding a matching probability for each feature extraction result parameter value, for example, a peak or scale value in the Laplacian of Gaussian (LoG). By using the values, the feature selection is performed according to priority of the matching probability for each feature value.

Figure 10:
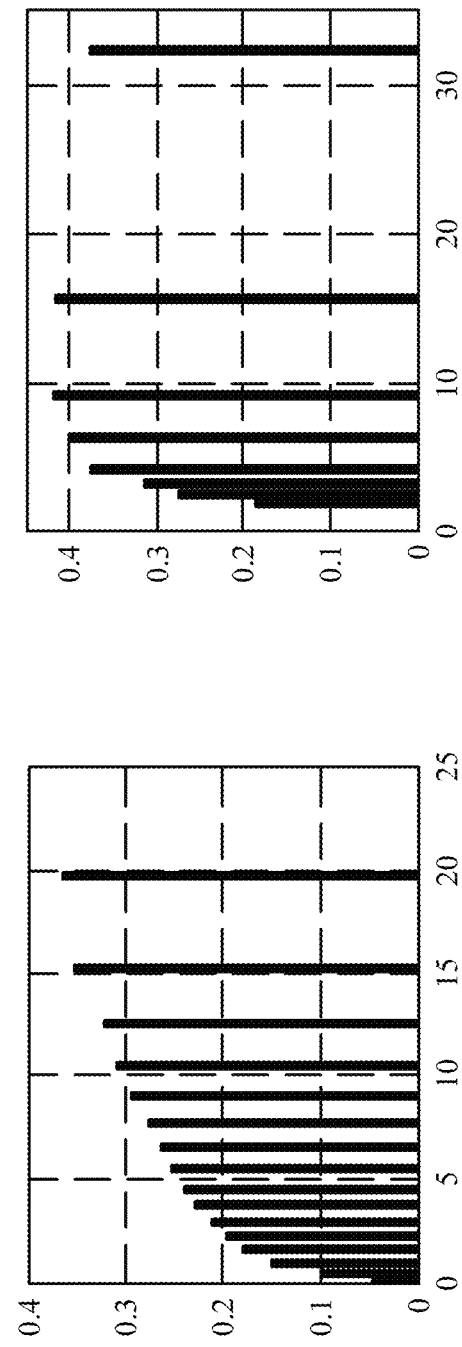
FIG. 10 is matching probability distribution charts according to feature extraction parameter.

FIG. 10 is matching probability distribution charts according to feature extraction parameters.

FIG. 10 shows probability density functions (Pdfs), that is, matching probabilities based on distributions of peak values and scale values obtained when features are extracted using the Laplacian of Gaussian (LoG), by utilizing matching pairs and non-matching pairs. In addition to such characteristic, a matching probability distribution may be formed according to parameter values given depending on various feature extraction algorithms, and a main feature value may be selected from among feature values preliminarily selected in the region selection. During the selection process, a higher value is preferentially selected by adding or multiplying and then listing the probabilities of the parameters in order.

Figure 11A:
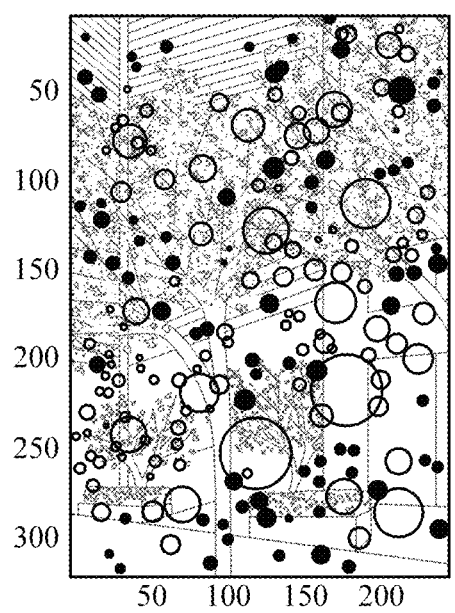
FIGS. 11A to 11C are views showing an example of a change in feature for each feature selection step.
Figure 11B:
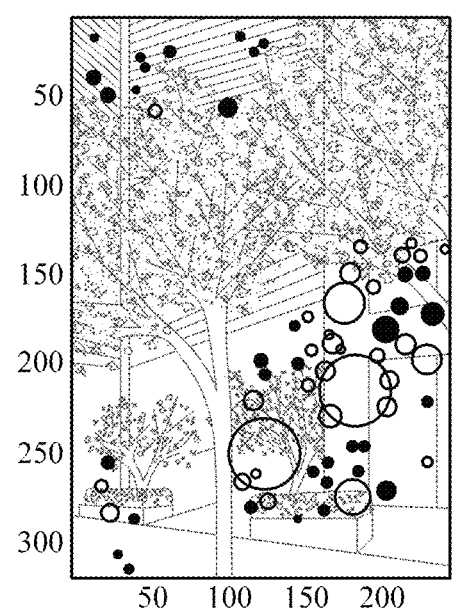
Figure 11C:
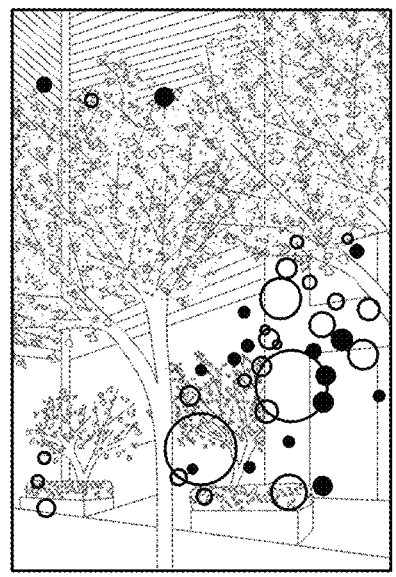

FIGS. 11A to 11C are views showing an example of a change in a feature for each feature selection step.

FIG. 11A is an image before making a feature selection, FIG. 11B is an image after making a feature selection, and FIG. 11C is an image after making a matching-model-based feature selection. As shown, upon making the feature selection, it is possible to significantly decrease difficulties in the matching process caused by a tree, a vehicle, or the like and also to reduce the number of points due to the feature selection to reduce the amount of calculation performed for the matching. Generally, in order to calculate similarity among N features, N(N−1)/2 calculations are performed. Accordingly, the number of points is a very important factor for performing the calculations.

Figure 12A:
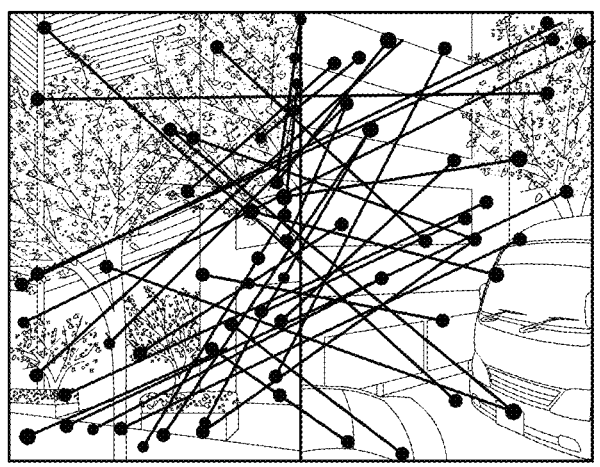
FIGS. 12A and 12B are views showing an example of matching before making a feature selection and an example of matching after making a feature selection.
Figure 12B:
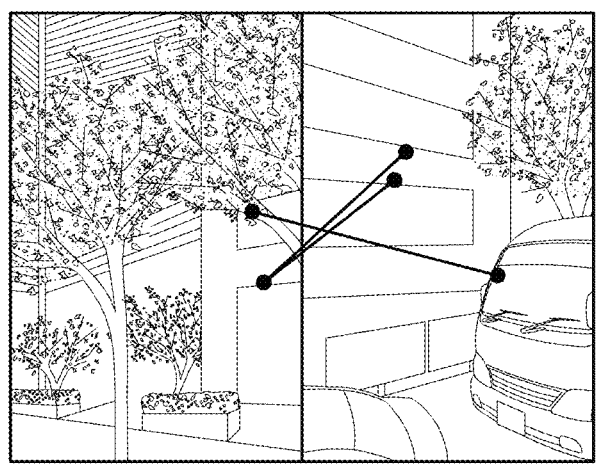

FIGS. 12A and 12B are views showing an example of matching before making a feature selection and an example of matching after making a feature selection.

Referring to FIGS. 12A and 12B, it can be seen that the matching processing after making the feature selection is greatly reduced compared to the matching processing before making the feature selection.

Next, a method of providing a city street search service according to an embodiment of the present invention will be described. The city street search service providing service largely includes a search data building step and a search data providing step.

Figure 13:
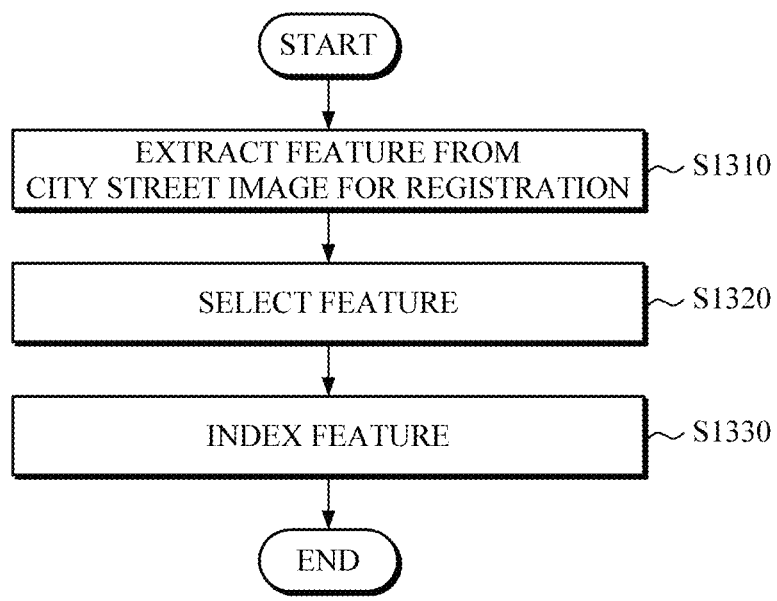
FIG. 13 is a flowchart for describing a search data building step according to an embodiment of the present invention.

FIG. 13 is a flowchart for describing the march data building step according to an embodiment of the present invention.

Referring to FIG. 13, the server 100 extracts two or more features for each of a plurality of city street images for registration that are collected (S1310).

The server 100 selects at least one feature from among the two or more extracted features according to a predetermined criterion. According to an embodiment, the feature selection may include two selection processes including region-classification-based feature selection and matching-model-based feature selection. In the region-classification-based feature selection, a region corresponding to an obstacle element is excluded from the two or more features. That is, a region corresponding to an obstacle element such as a road, sky, a vehicle, etc. is determined, and extraction of features from the corresponding region is limited. In the matching-model-based feature selection, a reselection is performed from the features selected in the region-classification-based feature selection using a matching model. A detailed description thereof will be provided with reference to FIG. 15.

The server 100 indexes and stores the reselected features in the street information DB 140 (S1330). A feature indexing method uses an index training DB, extracts features on a large scale, obtains K representative values, and uses a relation with the values. For example, when K-means clustering, which is a representative clustering method, is used, 128 core representative values may be obtained, and a feature index may be formed by utilizing a distribution (an average and a variance) of the representative values and the feature values.

Figure 14:
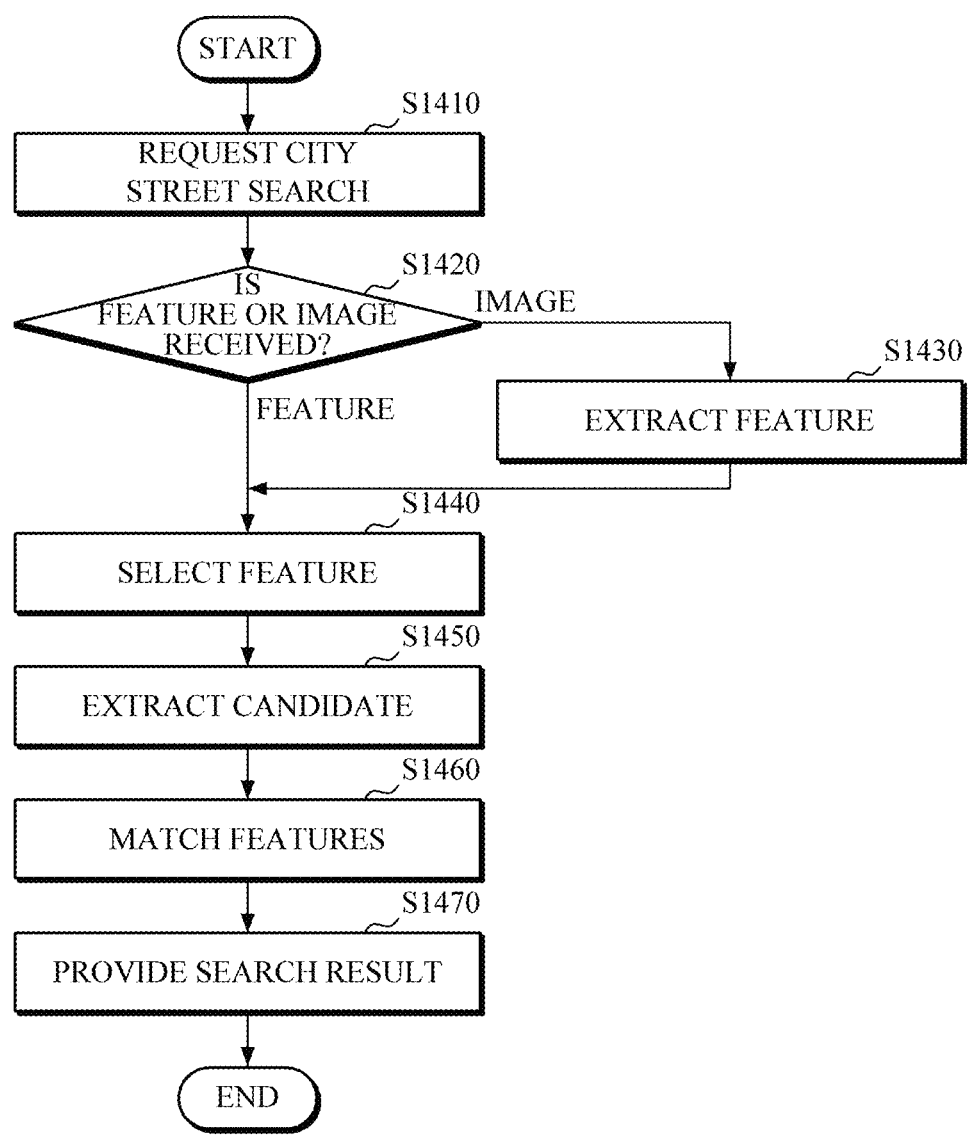
FIG. 14 is a flowchart for describing a search service providing step according to an embodiment of the present invention.

FIG. 14 is a flowchart for describing the search service providing step according to an embodiment of the present invention.

Referring to FIG. 14, when a street search is requested by the user terminal 10 (S1410), the server 100 determines whether a features is received in addition to a city street image search image (S1420).

When a result of the determination in S1420 is that only the city street image for searching is received, the server 100 extracts two or more features from the received city street image for searching (S1430) and proceeds to S1440.

On the other hand, when a result of the determination in S1420 is that two or more features of the city street image for searching are received, the server 100 selects at least one feature according to a predetermined criterion (S1440). Here, the feature selection unit 121 may select features two times. That is, the server 100 excludes a region corresponding to an obstacle element from the two or more features, forms a matching probability distribution of each of the features selected using a matching model, and selects a predetermined number of features in descending order of matching probability. A detailed description thereof will be provided with reference to FIG. 15.

The server 100 extracts a candidate list for a city street image for registration corresponding to at least one feature that is selected (S1450). In this case, the server 100 may create a list of similar image candidates by using the feature index. For the candidate list, a list of images that have a threshold value or less is formed by comparing distances from the features. In addition, in consideration of a relation between feature points in this list, geometric verification is performed by utilizing a method such as random ample consensus (RANSAC).

The server 100 matches at least one selected feature and the city street image for registration included in the extracted candidate list (S1480) and performs verification on the matched feature (S1470). Subsequently, the server 100 provides the user terminal 10 with a matching result as result information regarding the city street image for searching.

Figure 15:
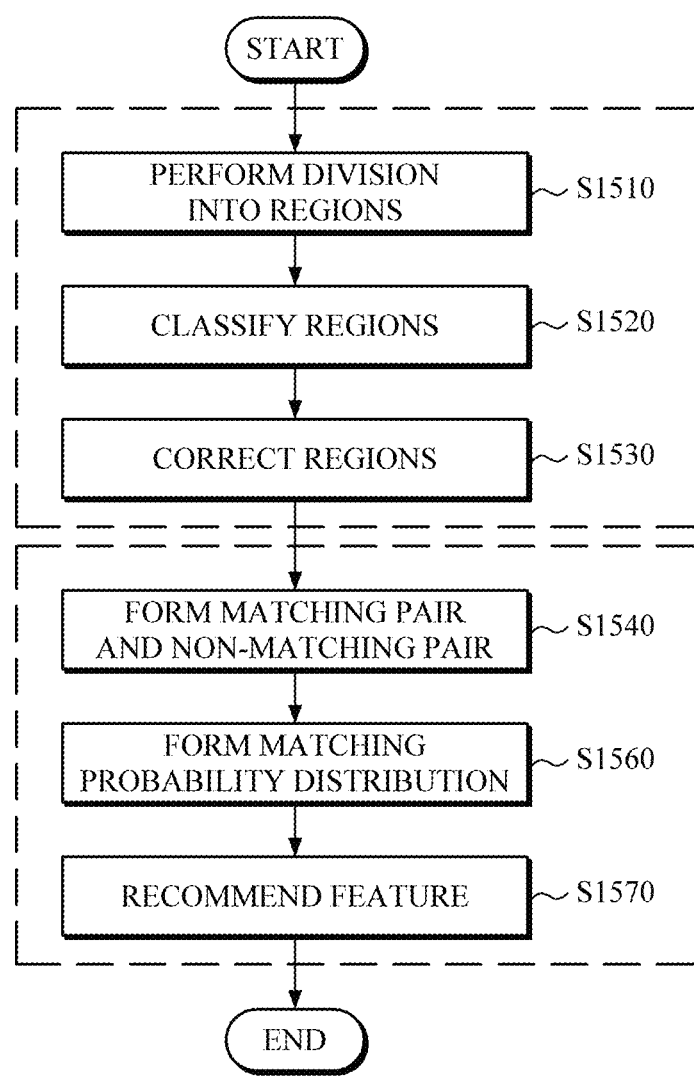
FIG. 15 is a flowchart for describing a feature selection step according to an embodiment of the present invention.

FIG. 15 is a flowchart for describing the feature selection step according to an embodiment of the present invention.

Referring to FIG. 15, the server 100 divides the city street image for searching into a predetermined number of regions (S1510). The server 100 classifies the divided regions according to a learning model for the region classification and excludes features included in regions classified as obstacle elements (S1520). Additionally, the server 100 may correct a result for the region classification according to prior region information or a peripheral classification result (S1530). In this case, the region correction unit 430 may perform the correction using a prior probability table, and the prior probability table is formed by forming an overlapped image on the basis of learning data that indicates in advance a road region and a sky region and normalizing the overlapped image to a probability value.

When an image feature is extracted or selected using such a configuration of the present invention, the following effects may be expected.

The street search service essentially requires building a large DB. Here, the DB may be built manually or by utilizing a panorama image such as a Google Street View. When an additionally captured obstacle is not considered in the above process, the size of the DB may increase, and also the obstacle may cause performance degradation.

However, when the method proposed by the present invention is applied to the DB building process, extracting features from unnecessary parts in various images may be prevented, as shown in the Table below. Only features having high matching performance may be selected on the basis of a probability model that is relearned as a matching pair and a non-matching pair. Also, the method proposed by the present invention does not depend on a 3D model or other data values of an external apparatus.

By building such a feature DB and making a feature selection by a terminal or a server, accurate performance can be achieved using a relatively small amount of data. A comparative experimental result for a photo DB having the same size is represented as Table 1 below.

TABLE 1

|  | average | performance |
| --- | --- | --- |
| Total number of features | 1475 | 60% (Top 1) |
| The number after selection | 834 | 67% (Top 1) |

It can be seen that the number of points is reduced to 56%, and the performance may be improved by about 7%. Also, DB storage efficiency may increase due to the number of points, and also a distance calculation rate in proportion to the number of features upon the search may be significantly reduced.

The current embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in different order and/or if components in a described system, architecture, device, or circuit are combined in a different manner and/or replaced or supplemented by other components or their equivalents. Accordingly, other implementations are within the scope of the following claims.

What is claimed is:

1. A server for providing a city street search service, the server comprising:
a processor; and a memory storing one or more instruction units being executed by the processor using an algorithm,
the instruction units comprising,
a street information database configured to store city street images for registration and feature and meta information mapped to the images;
in response to receipt of a city street image search request from a user terminal, a feature selection unit configured to select at least one feature from at least two or more features according to a predetermined criterion;
a candidate extraction unit configured to extract a candidate list of a city street image for registration corresponding to the at least one selected feature from the street information database;
a feature matching unit configured to match the extracted city street image with the at least one selected feature; and
a search result provision unit configured to provide the user terminal with a result of the match as result information regarding the city street image for searching, and
wherein the feature selection unit divides the city street image for searching into a predetermined number of regions, classifies the divided regions according to the learning model for region classification, and excludes features included in regions classified as obstacle elements including roads, sky, and vehicles,
wherein the feature selection unit further comprises a region correction unit configured to correct a result for the region classification using a prior probability table, and
wherein the prior probability table is formed by generating an overlapped image on the basis of learning data that indicates, in advance, regions classified as the obstacle elements and normalizing the overlapped image.

2. The server of claim 1, further comprising:
a feature extraction unit configured to, in response to receipt of the city street image for searching from the user terminal, extract at least two or more features from the received city street image for searching and to output the features to the feature selection unit.

3. The server of claim 1, wherein the feature selection unit comprises:
a matching-model-based feature selection unit configured to perform a reselection from the features selected by the region-classification-based feature selection unit using a matching model.

4. The server of claim 3, wherein:
the feature selection unit further comprises a region classification database configured to store a learning model for region classification.

5. The server of claim 3, further comprising:
a matching model database configured to store a matching model composed of a matching pair, which is a pair of photographs that include a building that is the same therein, and a non-matching pair, which is a pair of photographs that do not include a building that is the same therein, wherein the matching-model-based selection unit forms a matching probability distribution for each of the features selected using the matching model and selects a predetermined number of features in descending order of matching probability.

6. The server of claim 1, further comprising:
a search data building unit configured to extract at least two or more features of each of the city street images for registration, select at least one feature from among the at least two or more extracted features according to a predetermined criterion, and index and store the selected feature in the street information database.

7. The server of claim 6, wherein the search data building unit comprises:
a region-classification-based feature selection unit configured to exclude a region corresponding to an obstacle element from the at least two or more features; and
a matching-model-based feature selection unit configured to perform reselection from the features selected by the region-classification-based feature selection unit using a matching model.

8. A computer-implemented method of providing a city street search service, the method comprising:
in response to receipt of a city street image search request from a user terminal, selecting at least one feature from at least two or more features according to a predetermined criterion;
extracting a candidate list of a city street image for registration corresponding to the at least one selected feature from a street information database that is previously built;
matching the extracted city street image with the at least one selected feature; and
providing the user terminal with a result of the match as result information regarding the city street image for searching, and
wherein the selecting comprises:
dividing the city street image for searching into a predetermined number of regions;
classifying the divided regions according to a learning model for region classification;
correcting a result for the region classification using a prior probability table; and
excluding features included in regions classified as the obstacle elements including roads, sky, and vehicles, and
wherein the prior probability table is formed by generating an overlapped image on the basis of learning data that indicates, in advance, regions classified as the obstacle elements and normalizing the overlapped image.

9. The method of claim 8, further comprising:
in response to receipt of the city street image for searching from the user terminal, extracting the at least two or more features from the received city street image for searching.

10. The method of claim 8, wherein the selecting further comprises:
performing reselection from the selected features using a matching model.

11. The method of claim 8, further comprising:
extracting at least two or more features of each of the city street images for registration;
selecting at least one feature from among the at least two or more extracted features according to a predetermined criterion; and
indexing and storing the selected feature in the street information database.

12. The method of claim 11, wherein the selecting comprises:
a first selection step for excluding a region corresponding to an obstacle element from the at least two or more features; and second selection step for performing reselection from the selected features using a matching model.

* * * * *